United States Patent
Roux et al.

(10) Patent No.: US 9,704,153 B2
(45) Date of Patent: Jul. 11, 2017

(54) SYSTEM AND METHOD FOR ENABLING TRANSACTIONS ON AN ASSOCIATED NETWORK

(71) Applicant: Conduent Business Services, LLC, Dallas, TX (US)

(72) Inventors: Pascal Roux, Chabeuil (FR); Eric Jean, Monteleger (FR); Geraldine Lievre, Tournon-sur-Rhone (FR); Jean-Luc Meunier, St-Nazaire les Eymes (FR); Victor Ciriza, Saint Martin d'Uriage (FR); Michel Gastaldo, Saint Ismier (FR); Frederic Roulland, Le Versoud (FR)

(73) Assignee: Conduent Business Services, LLC, Dallas, TX (US)

( * ) Notice: Subject to any disclaimer, the term of this patent is extended or adjusted under 35 U.S.C. 154(b) by 906 days.

(21) Appl. No.: 13/740,380

(22) Filed: Jan. 14, 2013

(65) Prior Publication Data

US 2014/0201066 A1   Jul. 17, 2014

(51) Int. Cl.
G06Q 99/00 (2006.01)
G06Q 20/32 (2012.01)
G06Q 20/04 (2012.01)

(52) U.S. Cl.
CPC ..... *G06Q 20/3278* (2013.01); *G06Q 20/0457* (2013.01); *G06Q 20/3227* (2013.01)

(58) Field of Classification Search
CPC .......... G06Q 20/3278; G06Q 20/0457; G06Q 20/3227

(Continued)

(56) References Cited

U.S. PATENT DOCUMENTS 6,671,737 B1  12/2003 Snowdon et al.
2006/0022033 A1*  2/2006 Smets ............... G06Q 20/32
                                                   235/380

(Continued)

FOREIGN PATENT DOCUMENTS

EP          2 493 232 A1    8/2012
WO    WO2012/164368 A2 *  12/2012   ............. G06F 21/00

OTHER PUBLICATIONS

A700x Family Secure authentication microcontroller, Product short data sheet, Rev 3.1, Jul. 5, 2013, 18 pages.*

(Continued)

*Primary Examiner* — James D Nigh
(74) *Attorney, Agent, or Firm* — Fay Sharpe LLP

(57) ABSTRACT

A method and system are disclosed for wireless payment and information collection. A central system generates a personalized application including unique application and transaction identifiers, security keys, and signatures for a user device. The user device implements the personalized application in order to access the services of the associated network. Tags, capable of short-range communication with the user devices, are deployed to service access points of the associated network. The tags and user device mutually authenticate and share identifiers. Validation of the user device results in the tag updating an irreversible counter, generating transaction certificate, and logging this transaction information. The transaction certificate and a portion of the log are communicated to the user device, and service is granted. The user device transmits the transaction information and log to the central system for billing when a network connection is available.

17 Claims, 8 Drawing Sheets

(58) Field of Classification Search
USPC .......................................................... 705/64
See application file for complete search history.

(56) References Cited

U.S. PATENT DOCUMENTS

| | | | |
|---|---|---|---|
| 2006/0138245 A1* | 6/2006 | Lee ....................... | G11C 11/005 235/492 |
| 2007/0073929 A1* | 3/2007 | Takayama ............. | H04W 36/14 710/51 |
| 2008/0201212 A1* | 8/2008 | Hammad ............. | G06Q 20/045 705/13 |
| 2008/0203152 A1* | 8/2008 | Hammad ............... | G06K 17/00 235/380 |
| 2008/0238610 A1 | 10/2008 | Rosenberg | |
| 2009/0283591 A1 | 11/2009 | Silbernagl | |
| 2009/0313689 A1* | 12/2009 | Nystrom ............... | H04L 67/125 726/9 |
| 2010/0176919 A1 | 7/2010 | Myers et al. | |
| 2011/0264580 A1* | 10/2011 | Smets ................... | G06Q 20/10 705/39 |
| 2012/0116902 A1* | 5/2012 | Cardina ................ | G06Q 20/10 705/17 |
| 2012/0207305 A1* | 8/2012 | Gallo ..................... | G06Q 10/10 380/271 |
| 2012/0234914 A1 | 9/2012 | Roux | |
| 2013/0041775 A1* | 2/2013 | Rosenberg ............ | G06Q 30/02 705/26.9 |
| 2013/0145420 A1* | 6/2013 | Ting ........................ | H04L 63/08 726/1 |
| 2013/0212025 A1* | 8/2013 | Tanner ................. | G06Q 20/401 705/71 |
| 2013/0344804 A1* | 12/2013 | Chen ....................... | H04B 5/02 455/41.1 |
| 2014/0117927 A1* | 5/2014 | Chateau ............... | H04B 5/0075 320/108 |
| 2014/0122890 A1* | 5/2014 | Prot ..................... | G06F 21/606 713/176 |
| 2014/0215602 A1* | 7/2014 | Chuaprasort .......... | G06Q 30/02 726/20 |

OTHER PUBLICATIONS

A700x Family Secure authentication microcontroller, Product short data sheet, Rev 2.0, Aug. 25, 2011, 19 pages.*

European Search Report for Application No. EP 14150983.6; Dated: Jun. 2, 2014; Date of completion of the search: May 22, 2014; Place of search: Munich, Germany.

* cited by examiner

SYSTEM AND METHOD FOR ENABLING TRANSACTIONS ON AN ASSOCIATED NETWORK

BACKGROUND

The subject disclosure is directed to the near field communications arts, the communications arts, the service providing arts, the radio communications arts, the mobile computing arts, ticketing arts, and the like.

Ticketing is an essential function in public transportation networks. A ticketing function must successfully address several key requirements from both the traveler's and the operator's perspectives. Typical traveler requirements may include ease of use (easy to learn and routine in practice), clear and visible pricing, secure with respect to loss, theft or forgery, e.g., ticket books, passes, etc., and privacy preserving. Typical operator requirements of a ticketing function may include user acceptance (barriers to usage can quickly lead to a rejection of the transportation system by the public), security (confidentiality of the transaction, authentication and non-repudiation, fraud resistance (amateur and organized) and high availability. Additional requirements of the operator to ticketing functions will correspond to deployment costs, both for infrastructure (readers, validation systems, personnel, etc.) and mobility (tickets, cards, etc., in the hands of the traveler).

Near field communications ("NFC") is a set of standards for smartphones and similar portable user devices to establish radio communication with each other by touching them together or bringing them into close proximity, e.g., a few centimeters. The short-range wireless technologies employed in NFC operations typically require a distance of 10 cm or less. NFC requires an initiator and a target, with the initiator capable of actively generating an RF field that can power a passive target or communicate with an active target. This arrangement allows for the use of targets having a very simplistic form, such as tags, key fobs, stickers, cards, etc., which do not require batteries. NFC tags may be read-only or rewriteable, and may be custom encoded. NFC tags may be configured to provide various communication speeds, memory, security, data storage, write endurance, etc. In some instances, the target may include a power source, e.g., NFC peer-to-peer communications.

Current ticketing solutions in transportation networks utilize prepaid tickets that can be paper, magnetic or contactless cards related to a fare product (either prepaid or postpaid). Such solutions require substantial investments in infrastructure, including ticket readers, ticket dispensers, recharging stations, and the like. A transportation network, such as a city mass transit system, may require the deployment of multiple ticketing machines at the same location. These ticketing machines may be subject to vandalism, theft, or malfunction, which will negatively affect traffic throughput at the station.

Additionally, the above-identified ticketing solutions are subject to fraudulent activities involving the counterfeiting and theft of tickets/cards. Furthermore, such implementations represent a significant impact on boarding procedures, as the process for scanning/swiping/inserting the tickets increases the amount of time a traveler must invest to utilize the transportation network. For example, in certain mass transit systems, a traveler must insert a ticket to open a gate and then retrieve the ticket after passing through the gate. The amount of time each traveler must devote to this procedure may increase down the line as one traveler may cause a substantial backup at the entrance, e.g., cannot locate ticket, forgets where to insert, etc. Another example may relate to the boarding of buses at a busy stop, whereby each traveler is forced to provide exact change or a ticket, which must be scanned for validation. If the ticketing validation machine on the vehicle becomes inoperable, the bus is withdrawn from service, which affects not only travelers, but also revenues, by the transit authority.

Thus, it would advantageous to provide a system and method for a wireless ticketing system that uses near field communication in conjunction with a low cost infrastructure, providing ease of use and security for a user and low cost implementation for a transportation system.

INCORPORATION BY REFERENCE

The following references, the disclosures of which are incorporated herein by reference, in their entirety, are mentioned.

U.S. Patent Application Publication No. 2012/0234914 A1, published Sep. 20, 2012, entitled SYSTEM AND METHOD FOR VALIDATING THAT FARES HAVE BEEN PAID, by Pascal Roux.

U.S. Patent Application Publication No. 2009/0283591 A1, published Nov. 19, 2009, entitled PUBLIC TRANSIT SYSTEM FARE PROCESSOR FOR TRANSFERS, by Martin Silbernagl.

U.S. Pat. No. 6,671,737 B1, issued Dec. 30, 2003, entitled DECENTRALIZED NETWORK SYSTEM to Dave Snowdon and Natalie S. Glance.

BRIEF DESCRIPTION

In one aspect of the exemplary embodiment, a wireless method for enabling transactions on an associated network delivering services to end users is provided. The method includes generating a personalized application including a service providing application, an application certificate and a diversified key, and communicating the personalized application to at least one user device via an intermittent network connection. The method also includes receiving transaction information from the at least one user device corresponding to a transaction between the at least one user device and at least one of a plurality of tags deployed on the a corresponding plurality of affiliated network access points, the transaction information including a transaction certificate and at least a portion of a log of transactions stored on the at least one of the plurality of tags. The method further includes determining a price based upon the transactions associated with the received transaction information. The method also provides that at least one of the generating, communicating, receiving, and determining is performed with a computer processor.

In another aspect, a wireless system for enabling transactions on an associated network includes a central system. The central system comprises an application identifier generator that is configured to generate a unique application identifier for a service providing application corresponding to an associated user device. In addition, the central system includes an application certificate generator configured to generate an application certificate inclusive of the unique application identifier. The central system also includes a personalized application generator configured to generate a personalized application inclusive of the application, the application certificate, and a diversified key. Furthermore, the central system includes memory which stores instructions for analyzing transaction information received from the associated user device corresponding to a transaction between the associated user device and at least one of a plurality of tags deployed on an associated network, the transaction information including a transaction certificate and at least a portion of a log of transactions stored on the at least one of the plurality of tags, and determining a fare for at least one of the received transactions. The central system also includes a processor in communication with the memory which executes the instructions In another aspect, a computer-implemented method for enabling transactions on an associated network is provided. The method includes receiving, by a user device having a processor, a personalized application including a service providing application, an application certificate having an application identifier, an application signature, and a diversified key from an associated central system over an intermittent network connection. The method also includes authenticating with a tag via a near field communication connection, in accordance with the diversified key and a master key stored on the tag. Additionally, the method includes validating the user device for access to the associated network in accordance with an exchange of the application identifier and a tag identifier. Furthermore, the method provides for generating a notification to an associated user indicative of a successful transaction responsive to a validation of the user device, and receiving a transaction certificate from the tag, the transaction certificate including the application identifier, the tag identifier, a tag counter representative of an irreversible counter stored on the tag, and a transaction signature. The method also includes receiving at least a portion of a log from the tag, the log representative of a plurality of transactions between the tag and a plurality of user devices. In addition, the method includes communicating the transaction certificate and the at least a portion of the log to the central system via the intermittent network connection.

DETAILED DESCRIPTION

Figure 1A:
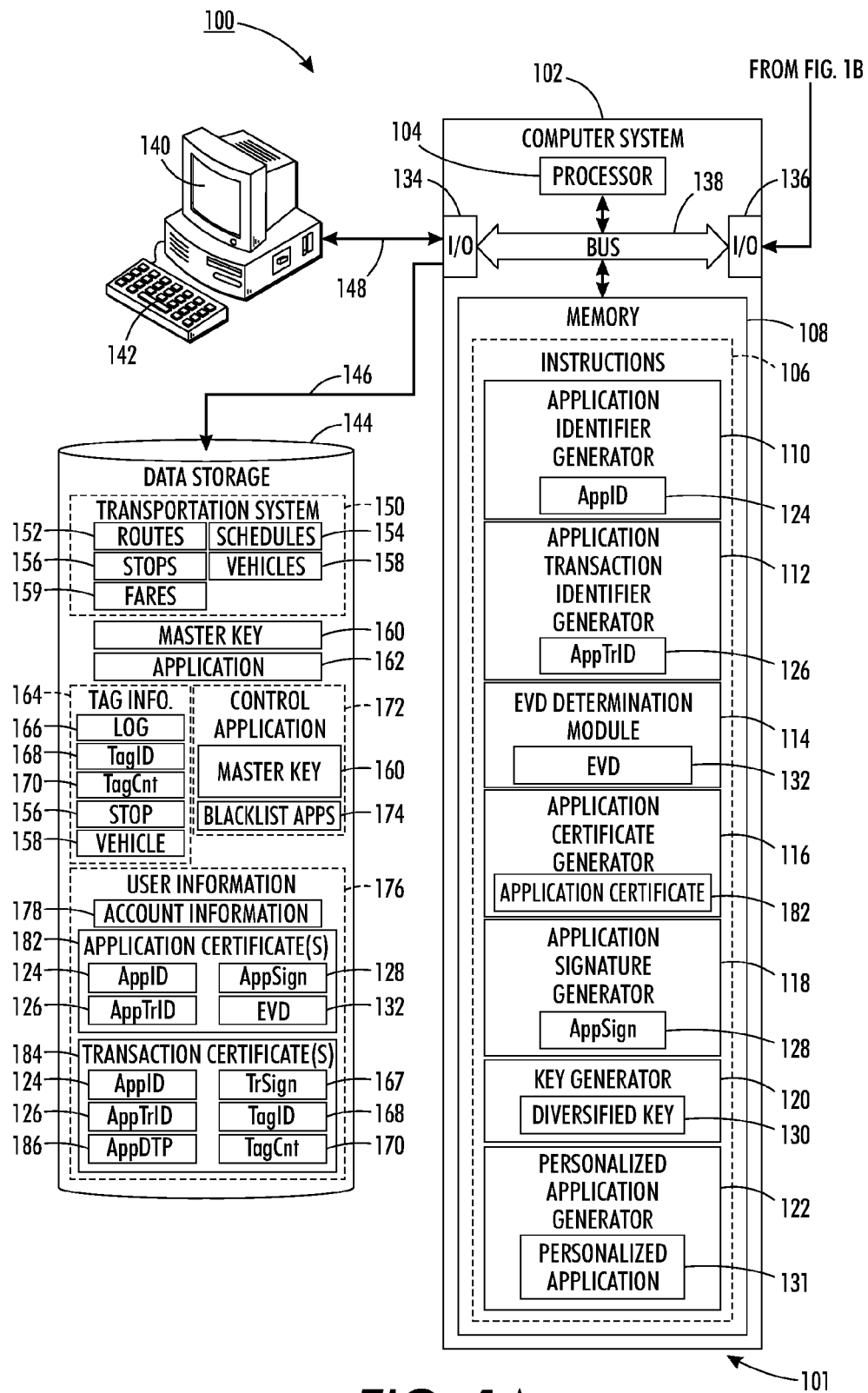
FIGS. 1A-1B are a functional block diagram of a wireless system for enabling transactions on an associated network delivering services to end users in accordance with one aspect of the exemplary embodiment.

One or more embodiments will now be described with reference to the attached drawings, wherein like reference numerals are used to refer to like elements throughout.

In one aspect, a method for enabling transactions is provided for an associated network delivering services to users that utilizes a low-cost infrastructure and provides ease of use and security for a user. A user registers himself and creates an account in the unique central system, then downloads an application to a user device, such as a mobile smart phone. During registration, payment information may be provided to the system in the form of a credit card, debit account, or billing account. The application is resident on a mobile device, such as a smart phone, that is capable of near field communications (NFC). During setup of the application on the mobile device, a signed application certificate having a unique application identifier, a unique application transaction identifier, and a validity period are received from the central system.

One or more tags are deployed service access points to the associated network, such as entrances, exits, vehicles, stops, barriers, parking lot gates, etc., each tag having a unique identifier, an irreversible counter, a master key, and a log of previous transactions. In one embodiment, the log may correspond to a cyclic file which holds the most recent transactions. The tag need not be connected to any network, thus allowing the positioning of the tag on a variety of service access points, e.g., on vehicles of a transportation system, on entrances to venues, gates to parking lots, etc. The encryption of transmitted elements and the transaction log are kept to enforce security, reduce the risk of fraudulent activity, and respect privacy. The user device need only be placed in proximity to the tag to initiate a transaction, during which mutual authentication occurs, and a log of the transaction is recorded on the tag. The log, or a portion of the log, may be communicated back to the central system by the user device in conjunction with other transaction information corresponding to that particular user device. The user account is or will subsequently be charged for the service. In the event that the user device is unable to communicate the transaction and log, a subsequent user device, which will receive the log from the tag, will communicate it to the central system, thereby assuring the central system receives a record of all transactions that occurred between the tag and any user device.

As used herein, a "user" or "traveler" denotes an individual who is a customer of the system providing services such as transportation means.

"Controller" denotes the transportation network employee in charge of controlling proper use of the transportation network, and in particular proper provisioning of access to services, e.g., travel on vehicles of the transportation network, entry to parking lots, etc.

A "tag" includes a low-cost Near Field Communication (NFC) small device, powered or unpowered, which is capable of communication with an NFC-enabled user device over a short distance, e.g., up to 10 cm, which can be affixed to a vehicle, station, turnstile, gate, barrier or other accoutrement associated with systems and networks delivering services, as illustrated and discussed with respect to FIG. 2 below.

"User device" or "mobile device" denotes a device owned by the user and able to an "application" for interacting with the network delivering services to users. Examples of such a user device include, without limitation, mobile phones, personal data assistants, tablets, and other personal electronic devices. The user device may be NFC-enabled, as well as capable of data communication with one or more wired or wireless networks, as discussed with respect to FIG. 3 below.

Figure 4:
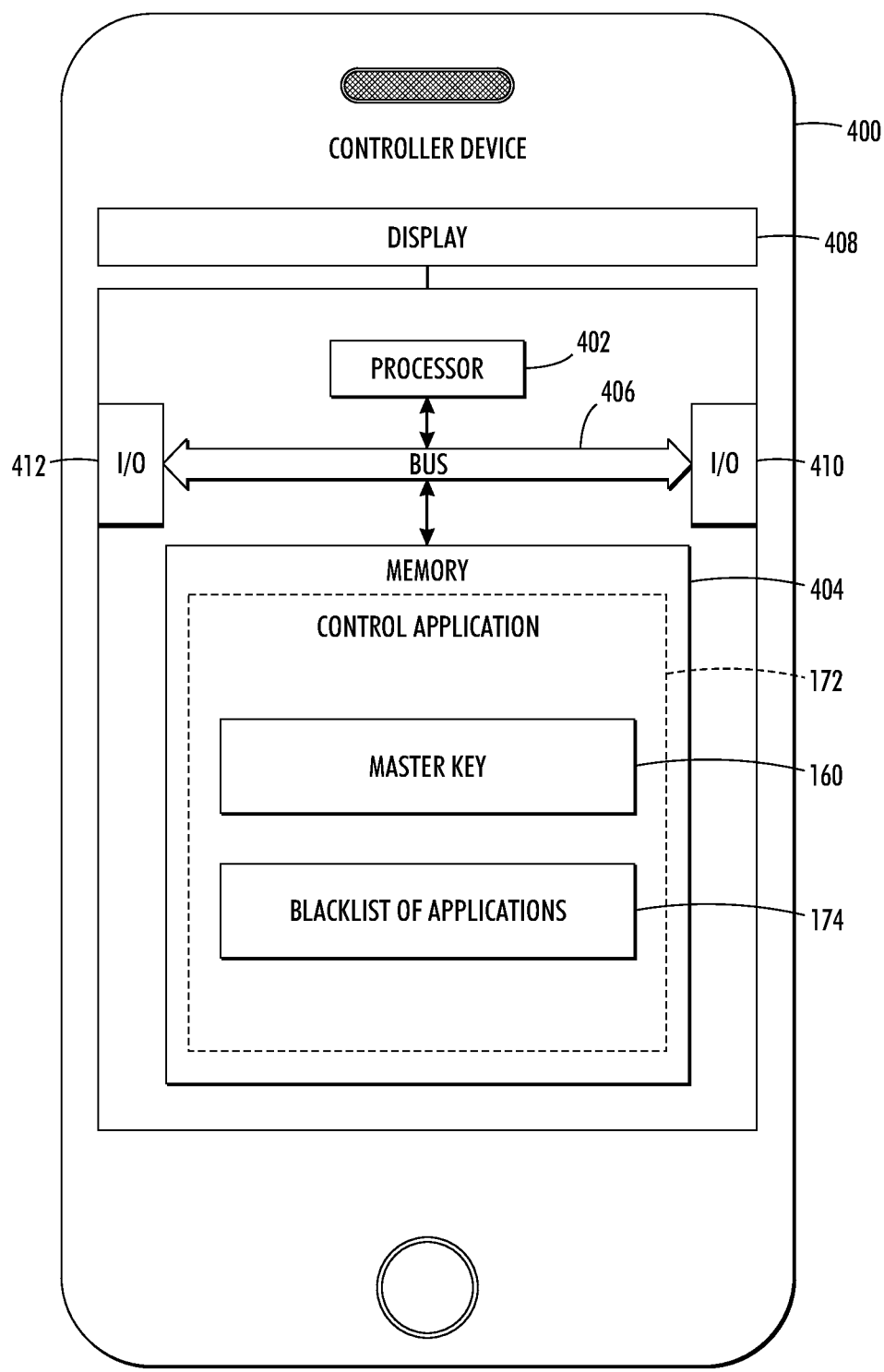
FIG. 4 is a functional block diagram of a control device used in the wireless system for enabling transactions on an associated network delivering services to end users in accordance with one aspect of the exemplary embodiment.

"Controller device" denotes a device provided to the controller running a "control application," as illustrated and discussed with respect to FIG. 4 below.

Figure 1B:
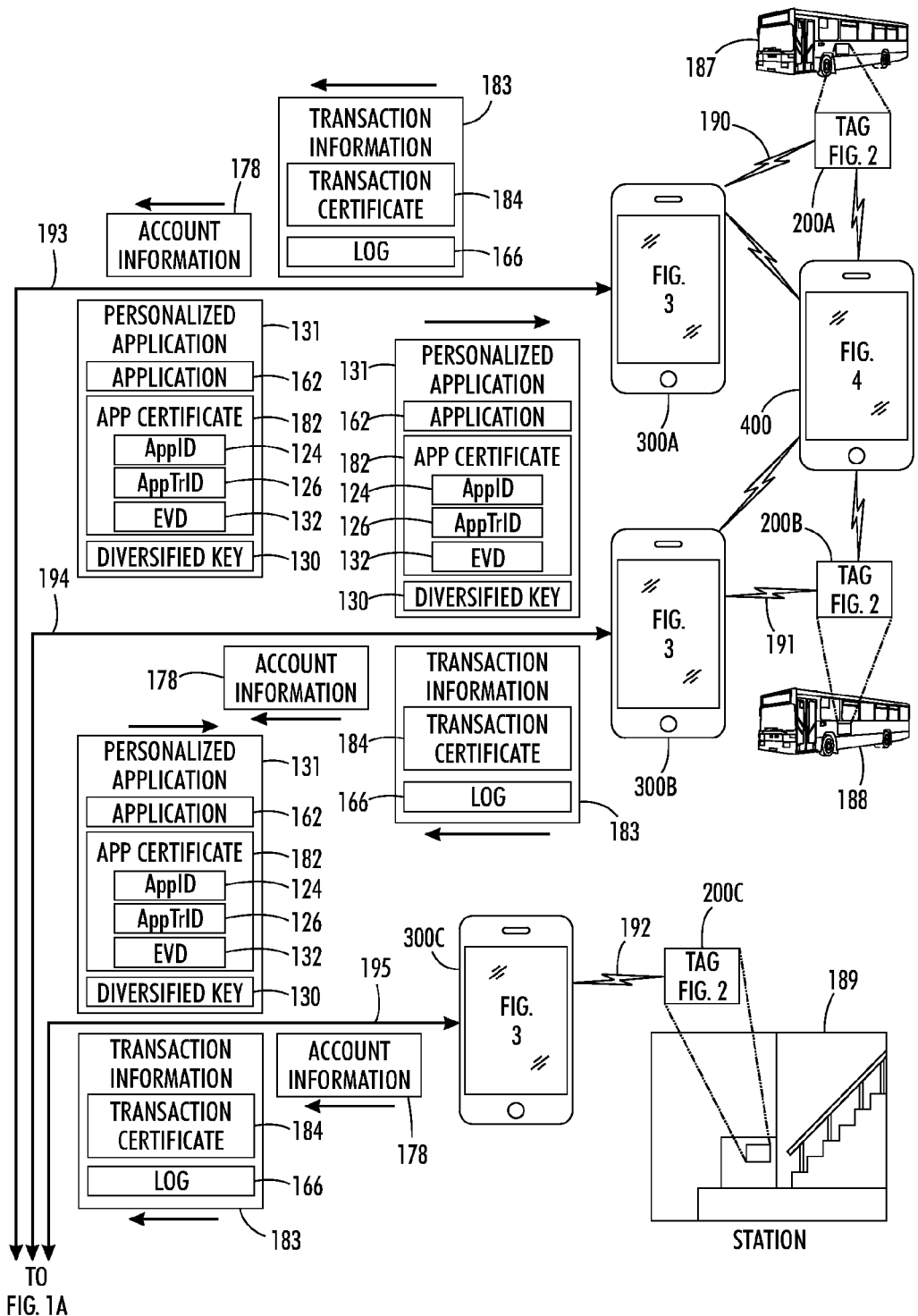

"Central system" denotes the server or servers in communication with the network providing services and the user device. The central system may include various components, as illustrated in FIGS. 1A-1B, configured to enable operation of the systems and methods described hereinafter. Reference is made hereinafter to an example implementation wherein the central system is in communication with a "transportation system" (defined below); however the subject systems and methods set forth in the instant disclosure are capable of implementation with respect to any system or network that delivers or provides services to users, including, without limitation, taxis, parking, buses, subways, metros, trams, and the like.

"Transportation system" generally denotes a transportation network that includes a set of routes, used in the example implementation of the subject disclosure. The routes are each traveled by one or more transportation vehicles of the transportation system, such as public transport vehicles, according to predefined schedules. The transportation vehicles may be of the same type or different types (bus, train, tram, or the like). In one embodiment, the transportation vehicles include buses or trams. There may be five, ten or more routes on the transportation network. Each route has a plurality of stops that are spaced in their locations and in most or all cases, a route has at least three, four, five or more stops. A traveler may select a first stop on one of the predefined routes from the set of available stops on the route as his origin stop and select a second stop on the same or a different route on the network as his destination stop. A traveler may make connections between routes before reaching the destination stop. The traveler purchases or is otherwise provided with a ticket, which is valid between the origin and destination stops.

In one aspect, a wireless system for enabling transactions on an associated network may include a user device equipped with a software application dedicated to the payment of a service, such as a transportation or parking service. In such an embodiment, NFC communications are used by multiple devices to effectuate low-cost low-infrastructure wireless ticketing, payments, and information collection. Accordingly, the system may include an NFC tag that identifies the requested service or transportation means (vehicle, station, stop, etc.). In the context of a transportation system, the NFC tag may be affixed on a bus, a subway gate, a taxi, or more generally on the vehicle or infrastructure entrance/exit. A controller device may also be implemented in such an embodiment, which is configured with a dedicated control software application that may communicate with the tags, the user devices, and a backend central system, such as a server. The backend central system in the aforementioned embodiment may be in permanent or transient communication with the user or controller devices, e.g., the respective applications resident thereon.

During operations of the aspect of the wireless system for enabling transactions referenced above, the user is granted access to the service by placing his mobile device close to a tag affixed at a place representing the consumption of some service, e.g., at an entrance to the transportation network. The service is then delivered. Continuing in the example of the transportation network, the service delivered may be authorizing the user to travel on the network by, for example, opening a gate/door/turnstile, etc. The controller device may be placed close to the user device allowing the application resident thereon to communicate with the controller device the transaction details associated with the service and thereby prove that payment was rendered. The tag is capable of storing a log of the most recent previous transactions from a plurality of user devices and the controller device may retrieve that log so as to allow remuneration for the services by the central system. In a gated transportation system, e.g., a parking lot, subway, metro, etc., the user may be required to exit via a gate, such that the user places the mobile device in proximity to another tag to open the exit gate, i.e., end the consumption of the service.

It will be appreciated that the systems and methods set forth herein are independent from both cellular telephone manufacturers and cellular phone network operators, based upon the use of the NFC standard. Additionally, the systems and methods are also independent of the SIM card capability and of mobile phone security services (e.g., GoogleWallet®). The systems and methods further provide robust interoperability for the user between multiple service providers utilizing the same application, with the user only having to register once with the central system prior to the first validation (transaction). Thus, the subject systems and methods provide low cost unconnected and optionally unpowered tags as infrastructure investment; intermittent, i.e., opportunistic, network connections of the user's device are tolerated by the system, and users can stay in disconnected mode for several services consumptions; and the system does not rely on the mobile SIM-card and is therefore independent from the mobile network operator.

It will further be appreciated that while illustrated in FIGS. 1A-1B as implemented in a transportation system, e.g., a mass transit or public transportation network, the systems and methods set forth hereinafter are equally adaptable and contemplated to extend to any network providing services to users. For example, the system may be implemented to enable transactions in a variety of environments, e.g., facilitate payment and information collection for parking lots, taxi services, airports, package shipping, and the like. Accordingly, while described below with respect to a transportation setting, it will be appreciated that myriad environments are capable of utilizing the systems and methods now set forth.

Referring now to FIGS. 1A-1B, there is shown a wireless transaction enablement system 100 configured for providing payment functionality and information collecting functions on an associated network delivering services to a user utilizing a short-range communications protocol. FIGS. 1A-1B illustrate an example implantation in the form of a transportation system that provides transportation services to users. Other embodiments may include implementation on varying networks, such as parking, shipping or taxi networks. It will be appreciated that the various components depicted in FIGS. 1A-1B are for purposes of illustrating aspects of the exemplary embodiment, and that other similar components, implemented via hardware, software, or a combination thereof, are capable of being substituted therein.

As shown in FIGS. 1A-1B, the wireless system 100 for enabling transactions includes a central system 101 represented generally as the computer system 102, which is capable of implementing the exemplary method described below. The exemplary computer system 102 includes a processor 104, which performs the exemplary method by execution of processing instructions 106 that are stored in memory 108 connected to the processor 104, as well as controlling the overall operation of the computer system 102.

The instructions 106 include an application identification generator 110 that generates a unique application identifier 124 (AppID) for each application 162 sent to a user device 300A, 300B, 300C. According to one embodiment, the AppID 124 may be generated during registration of a user associated with the user device 300A, 300B, 300C, and may, for example, correspond to any alphanumeric sequence of characters.

The instructions 106 may also include an application transaction identifier generator 112 that is configured to generate a unique application transaction identifier (AppTrID) 126 that represents an authorized transaction to be conducted between the user device 300A, 300B, 300C and the central system 101. That is, a unique AppTrID 126 may be generated specific to each application 162 resident on each user device 300A, 300B, 300C to be used for a transaction between the mobile device 300A, 300B, 300C and the central system 101. According to one embodiment, the application transaction identifier generator 112 may be configured to generate a new AppTrID 126 for an application 162 following the receipt of a log 166 by the central system 101 indicating a successful completion of a transaction that utilized the preceding AppTrID 126 of that particular application 162, as set forth in detail below.

The instructions 106 may further include an extreme validity date (EVD) determination module 114 that is capable of setting an EVD 132 for the AppTrID 126 associated with an application 162 resident on a user device 300A, 300B, 300C. That is, the EVD 132 may be representative of a date after which the AppTrID 162 will no longer be valid and capable of being used to procure services via the central system 101. For example, the EVD 132 may be set to a number of days, months, etc., after which the application 162 will be required to procure a new AppTrID 126 and corresponding EVD 132. In some embodiments contemplated herein, the EVD 132 may reflect a validation expiration date for a particular AppID 124, an application signature (AppSign) 128, a diversified key 130, and the like.

The instructions 106 may also utilize an application certificate generator 116 that is configured to generate an application certificate 182 for each application 162 associated with the user devices 300A, 300B, 300C. The application certificate 182 generally includes the AppID 124, an AppTrID 126, and the associated EVD 132. The application certificate 182 may then be signed to include an AppSign 128 generated via an application signature generator 118. The application signature generator 118 resident in the instructions 106 may be configured to digitally sign each application 162 as an indication that the application certificate 182, and thus the application 162, is a valid instance on a corresponding user device 300A, 300B, 300C. In some embodiments, the application certificate 182 may be stored in the data storage 144 in association with other user information 176, as discussed below.

The instructions 106 in memory 108 may also include a key generator 120 configured to utilize a master key 160 to generate a diversified key 130 for each application 162 communicated to an associated user device 300A, 300B, 300C. The diversified key 130 may be computed from the unique AppID 124 using the master key 160 and a key derivation function. In one embodiment, the key generator 120 may be configured to implement various types of cryptography (symmetric, asymmetric, etc.), thereby allowing the central system 101 via the key generator 120 to generate secret keys and/or public/private key pairs for each control application 172, each application 162 on a user device 300A, 300B, 300C, each tag 200A, 200B, 200C, etc.

In addition, the instructions 106 may include a personalized application generator 122 configured to generate a personalized application 131 for each user device 300A, 300B, 300C. The personalized application generator 122 may bundle the application 162, the application certificate 182, and the diversified key 130 to generate a personalized application 131. The personalized application 131 may then be communicated to the user device 300A, 300B, 300C that requested it.

The various components of the computer system 102 associated with the central system 101 may all be connected by a data/control bus 138. The processor 104 of the computer system 102 is in communication with an associated data storage 144 via a link 146. A suitable communications link 146 may include, for example, the public switched telephone network, a proprietary communications network, infrared, optical, or other suitable wired or wireless data communications. The data storage 144 is capable of implementation on components of the computer system 102, e.g., stored in local memory 108, i.e., on hard drives, virtual drives, or the like, or on remote memory accessible to the computer system 102.

The associated data storage 144 corresponds to any organized collections of data (e.g., account information, transportation system information, routes, schedules, vehicles, stop locations, tag information) used for one or more purposes. Implementation of the associated data storage 144 is capable of occurring on any mass storage device(s), for example, magnetic storage drives, a hard disk drive, optical storage devices, flash memory devices, or a suitable combination thereof. The associated data storage 144 may be implemented as a component of the computer system 102, e.g., resident in memory 108, or the like.

In one embodiment, the associated data storage 144 may include data corresponding to an associated transportation system 150, a collection of routes 152 (a sequence of stops 156 by an individual vehicle 158 along a course of travel available on the transportation system 150), schedules 154 that pertain to the arrival/departure times of buses, trams, subways or other vehicles 158, etc., of the transportation system 150, fares 159 corresponding to each stop 156 and/or vehicle 158 of the transportation system 150, tag information 164 (tag logs 166, tag identifiers (TagID) 168, tag counters (TagCnt) 170, stop 156 and/or vehicle 158 corresponding to the tag 200A, 200B, 200C location), control application data 172 (master key 160, a blacklist of applications 174), and user information 176 (account information 178, application certificates 182 (AppID 124, AppTrID 126, AppSign 128, EVD 132), and transaction certificates 184 (AppID 124, AppTrID 126, AppDTP (Application date, time, place) 186, TrSign 167, TagID 168, TagCnt 170)). The user account information 178 may include, for example, user name, billing information, mobile device 300 identification, address, passwords, and the like. Such account information 178 may be collected by the central system 101 during user registration of a user device 300A, 300B, 300C, as discussed below.

The computer system 102 may include one or more input/output (I/O) interface devices 134 and 136 for communicating with external devices. The I/O interface 134 may communicate, via communications link 148, with one or more of a display device 140, for displaying information, such estimated destinations, and a user input device 142, such as a keyboard or touch or writable screen, for inputting text, and/or a cursor control device, such as mouse, trackball, or the like, for communicating user input information and command selections to the processor 104.

It will be appreciated that the wireless system 100 for enabling transactions is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms. Furthermore, while depicted in FIGS. 1A-1B as a networked set of components, the system and method are capable of implementation on a stand-alone device adapted to perform the methods described herein.

The computer system 102 may include a computer server, workstation, personal computer, cellular telephone, tablet computer, pager, combination thereof, or other computing device capable of executing instructions for performing the exemplary method.

According to one example embodiment, the computer system 102 includes hardware, software, and/or any suitable combination thereof, configured to interact with an associated user, a networked device, networked storage, remote devices, or the like.

The memory 108 may represent any type of non-transitory computer readable medium such as random access memory (RAM), read only memory (ROM), magnetic disk or tape, optical disk, flash memory, or holographic memory. In one embodiment, the memory 108 comprises a combination of random access memory and read only memory. In some embodiments, the processor 104 and memory 108 may be combined in a single chip. The network interface(s) 134, 136 allow the computer to communicate with other devices via a computer network, and may comprise a modulator/demodulator (MODEM). Memory 108 may store the data processed in the method as well as the instructions for performing the exemplary method.

The digital processor 104 can be variously embodied, such as by a single core processor; a dual core processor (or more generally by a multiple core processor), a digital processor and cooperating math coprocessor, a digital controller, or the like. The digital processor 104, in addition to controlling the operation of the computer 102, executes instructions 106 stored in memory 108 for performing the method outlined in FIGS. 5-7.

The system 100 illustrated in FIGS. 1A-1B may include a plurality of tags 200A, 200B, 200C, deployed to a variety of locations on the affiliated system. In accordance with the example of the transportation system 150 as shown, tags 200A and 200B may be affixed to a location respectively within bus A 187 and bus B 188. Tag 200C is shown affixed to a stop 156 of the transportation system 150, depicted in FIGS. 1A-1B as the station 189. For example, tags 200A and 200B may be deployed immediately inside the doors of the buses A and B (187, 188) at a suitable height to allow for ease of communication with a user device 300A, 300B. When the tag 200C is affixed at a static location, e.g., the station 189, a parking entry/exit barrier, etc., the tag 200C may be positioned at a turnstile, gate, door, etc., via which a traveler is provided access to the bus, tram, train, etc., stopping at the station 189. In such example implementations, the tags 200A-200C may facilitate the granting or denying of access to the services provided at the location to which they are affixed, i.e., travel on the buses A, B 187, 188, access to a train platform in the station 189 for travel thereafter or access to a parking or to a taxi service provider, and the like. FIG. 2 provides a functional block diagram of an exemplary tag 200 corresponding to the tags 200A-200C of FIGS. 1A-1B.

Figure 2:
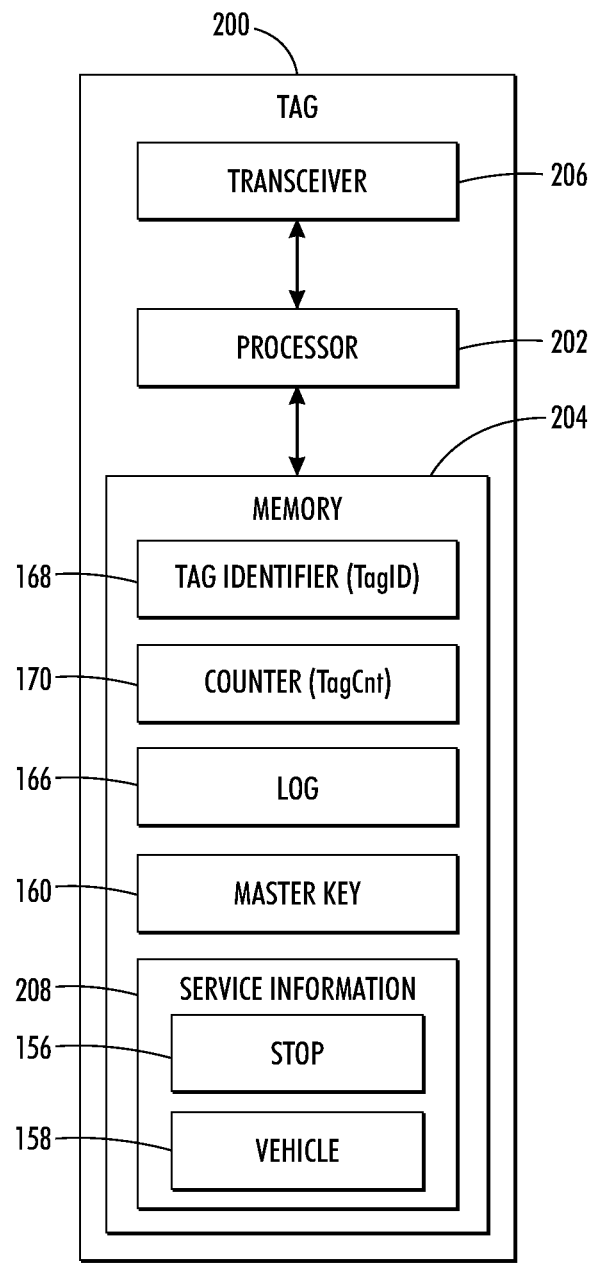
FIG. 2 is a functional block diagram of a tag used in the wireless system for enabling transactions on an associated network delivering services to end users in accordance with one aspect of the exemplary embodiment.

Turning now to FIG. 2, the tag 200 may be powered (self-contained power supply, not shown) or unpowered (shown in FIG. 2). The tag 200 includes a processor 202 in communication with memory 204 and a transceiver 206. The processor 202 may include a random number generator and other suitable components to facilitate the systems and methods discussed hereinafter. The memory 204 may comprise non-volatile and/or volatile memory capable of storing various types of data. The tag 200 may utilize symmetric cryptography (3DES, AES, etc.) or asymmetric cryptography (RSA, ECC, etc.). The memory 204 may include a unique tag identifier (TagID) 168 associated with the tag 200 and supplied by the central system 101 during deployment of the tag 200 to a stop 156 or vehicle 158 of the transportation system 150. The memory 204 may also include one or more irreversible digital counter(s) (TagCnt) 170 configured to count a number of transactions conducted between the tag 200 and user devices 300A, 300B, 300C. The memory 204 further includes a log 166 that stores transaction information 183 corresponding to relevant information about transactions which have occurred between the tag 200 and the user devices 300A-300C. During deployment by the central system 101, the tag 200 may receive and store in memory 204 a master key 160, which may be used for authentication during transactions with user devices 300A-300C, as well as in the signing of transaction certificates 184, i.e., the TrSign 167. In addition, the memory 204 may store service information 208 pertaining to the type of service associated with the deployed tag 200. For example, the service information 208 may include an identification of the stop 156 and/or vehicle 158 to which the tag 200 is affixed. The transceiver 206 of the tag 200 may correspond to any suitable component capable of establishing bi-directional communication between the tag 200 and the user devices 300A-300C or controller device 400.

Returning to FIGS. 1A-1B, one or more user devices 300A, 300B, and 300C may be in intermittent communication with the central system 101 via respective communication links 193, 194, and 195. That is, the user devices 300A, 300B, and 300C may utilize opportunistic communications with the central system 101, such that when a cellular or data network is available, the user devices 300A, 300B, and 300C use that opportunity to communicate with the central system 101. In one embodiment, each user device 300A, 300B, 300C may be implemented as a smartphone employing an operating system such as iOS, ANDROID, BLACKBERRY, WINDOWS, or the like, or any device having NFC capabilities. The user devices 300A-300C are representative of any personal computing devices, such as personal computers, netbook computers, laptop computers, workstation computers, personal data assistants, web-enabled cellular telephones, tablet computers, proprietary network devices, or other web-enabled electronic devices. The data communications links 193-195 between the central system 101 and the user devices 300A-300C may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications. In one embodiment, the user devices 300A-300C may communicate with the central system 101 via a cellular data network. It will be appreciated that each user device 300A-300C need not maintain a constant connection to the central system 101.

Figure 3:
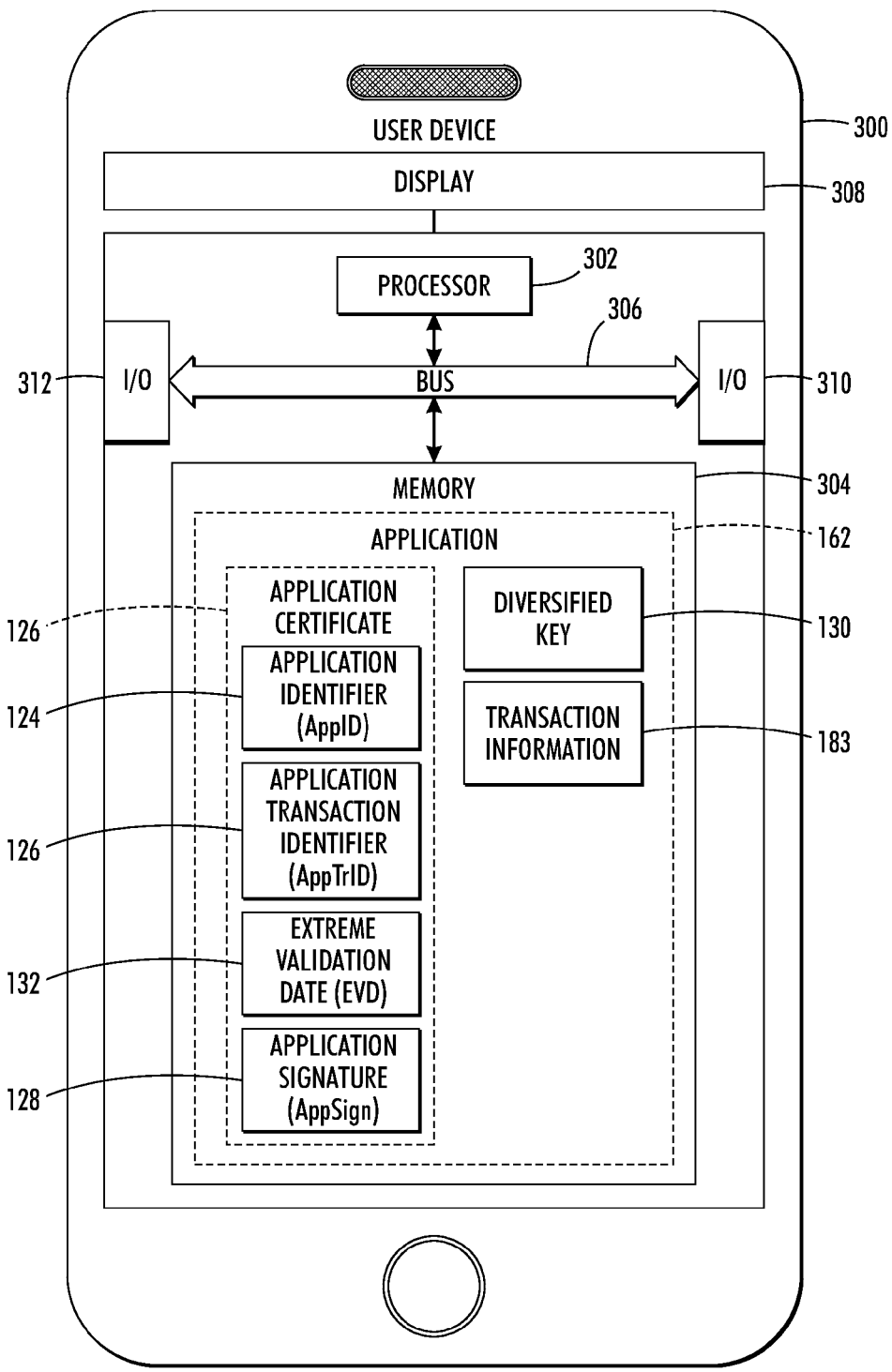
FIG. 3 is a functional block diagram of a user device used in the wireless system for enabling transactions on an associated network delivering services to end users in accordance with one aspect of the exemplary embodiment.

FIG. 3 provides an example illustration of a user device 300 representative of the user devices 300A-300C depicted in FIGS. 1A-1B. The user device 300 may include a processor 302, which executes one or more instructions or applications 162 in the performance of an exemplary method discussed below. The user device 300 may further include a memory 304 storing the application 162 in data communication with the processor 302 via a system bus 306. The processor 302 of the user device 300 may be in data communication with the central system 101 via an I/O interface 312 and tags 200A-200C via an I/O interface 310. In one embodiment, the I/O interface 310 is implemented as a short-range communication component, such as, for example an NFC component. In such an embodiment, the I/O interface 310 may be configured to provide power to the tag 200A-200C to enable communication there between. In other embodiments, the short range communication component may be implemented using any suitable short range communications protocol, and the use of NFC protocols is for example purposes only. The user device 300 may further include a display 308 suitably configured to display data to an associated user, receive input from the associated user, and the like. In some embodiments, the display 308 of the user device 300 may be configured as a touch-screen display capable of receiving user instructions via user contact on the display, e.g., LCD, AMOLED, LED, RETINA, etc., types of touch-screen displays.

The memory 304 may represent any type of non-transitory computer readable medium such as random access memory (RAM), read only memory (ROM), magnetic disk or tape, optical disk, flash memory, or holographic memory. In one embodiment, the memory 304 comprises a combination of random access memory and read only memory. In some embodiments, the processor 302 and memory 304 may be combined in a single chip. The network interface(s) 310, 312 allow the user device 300 to communicate with other devices via a communications network, and may comprise a modulator/demodulator (MODEM). Memory 304 may store data the processed in the method as well as the instructions for performing the exemplary method. The digital processor 302 can be variously embodied, such as by a single core processor, a dual core processor (or more generally by a multiple core processor), a digital processor and cooperating math coprocessor, a digital controller, or the like.

The memory 304 of the user device 300 includes the application 162 received as part of the personalized application 131 communicated from the central system 101 during registration of the user device 300, as discussed below with respect to FIGS. 5-7. The application 162 stored in memory 304 may include the application certificate 182 having the AppID 124 unique to the instance of the application 162 on the user device 300. The application certificate 182, as discussed above, further includes one or more of the following: an AppTrID 126, an EVD 132, and an AppSign 128. The user device 300 may be configured to further store the diversified key 130 in memory in conjunction with the application certificate 182.

As shown in FIGS. 1A-1B, the user devices 300A-300C are capable of intermittent (opportunistic) or continuous bi-directional communication with the central system 101 utilizing the I/O interface 312. In one embodiment, the bi-direction communication is data communication utilizing a cellular data network, e.g., $3^{rd}$ generation mobile phone standards (3G), $4^{th}$ generation standards (4G, 4G LTE, WiMax), EV-DO, standalone data protocols, and the like. The user device 300A-300C may provide account information 180 to the central system 101 during registration therewith. The central system 101 may then register the user associated with the user device 300A-300C and generate a personalized application 131 for communication to the user device 300A-300C. The receiving user device 300A-300C, via the processor 302, may then install the application 162, the application certificate 182, and store the diversified key 130 in memory 304.

The user may then bring the user device 300A-300C into proximity with a tag 200A-200C to conduct a transaction, e.g., to board a bus 187-188 or enter a train station 189. Once in proximity, the I/O interface 310, i.e., the NFC component of the user device 300A-300C, may generate an RF field which is capable of powering the tag 200A-200C. The user device 300A-300C then reads the tag 200A-200C (establishes an NFC radio communication with the tag 200A-200C, i.e., the communications links 190, 191, 192). The tag 200A-200C and the user device 300A-300C authenticate each other using the diversified key 130. In one embodiment, the processor 302 in accordance with the application 162, provides its AppID 124 to the tag 200A-200C. The tag 200A-200C may then compute the diversified key 130 of the application 162 of the particular user device 300A-300C using the master key 160 stored in memory 204. The user device 300A-300C and the tag 200A-200C may then challenge each other using this shared secret and thereby perform mutual authentication.

The tag 200A-200C and the user device 300A-300C then exchange their respective identifiers, i.e., the AppID 124 and the TagID 168, the TagCnt 170, and the AppTrID 126. The processor 302, in accordance with the application 162, then signs the TagID 168 and irreversible counter (TagCnt 170), and provides this to the tag 200A-200C. In some embodiments, the user device 300A-300C may also provide the time, date, and location (e.g., cell-tower position, GPS, etc.) to the tag 200A-200C. The tag 200A-200C, via the processor 202, generates a transaction certificate 184 signed using the master key 160 or using a key unique to the particular tag 200A-200C. The counter 170 (TagCnt) is then incremented and the transaction details are recorded in the log 166 for non-repudiation. The signed transaction certificate 184 is then communicated from the tag 200A-200C to the user device 300A-300C. In the event that the transaction is not successful a rejection of the transaction is sent from the tag 200A-200C to the user device 300A-300C.

In some embodiments, the application 162 may include instructions directing the user device 300A-300C to generate some form of feedback to the user indicating either success or failure in completing the transaction with the tag 200A-200B. Suitable examples of such feedback include, without limitation, auditory, visual, tactile (vibration), or any combination thereof. Preferably, success and failure notifications utilize different types of feedback or different versions of the same type. Contemporaneous with such feedback, the user device 300A-300C may request the tag 200A-200C to perform some service, e.g., open a gate, unlock a turnstile, open a door, etc. Alternatively, the tag 200A-200C may proactively provide some service, e.g., open a gate, unlock turnstile, open door, etc., without receiving a request from the user device 300A-300C. After rendering the service, the processor 202 associated with the tag 200A-200C may update the entry in the log 166 to reflect the performance of the service.

The tag 200A-200C may then provide all or a portion of the log 166 to the application 162 on the user device 300A-300C. That is, the processor 202 associated with the tag 200A-200C may retrieve all entries or a portion of entries (e.g., the last five, ten, fifteen, etc. entries) in the log 166 and communicate these entry(ies) to the user device 300A-300C via the communication link 190-192. In some embodiments, the user device 300A-300C provides the tag 200A-200C with up to date information, i.e., the date, time, current position, time-table, line information, etc. In other embodiments, the updated information is provided to the tag 200A-200C by the central system 101 utilizing the user device 300A-300B.

The processor 302, in accordance with the application 162, of the user device 300A-300B then transmits transaction information 183 to the central system 101. The transaction information 183, as illustrated in FIGS. 1A-1B, may include, for example, the transaction certificate 184 and all or portion of the log 166 received from the tag 200A-200C. The application transaction identifier generator 112 then generates a new AppTrID 126, as well as a new AppSign 128 from the application signature generator 118 of the application certificate 182, for the application 162 resident on the user device 300A-300C from which the transaction information 183 was received. The central system 101 may also return new update information to the user device 300A-300B for refreshing tags 200A-200C during subsequent transactions.

After receipt of the transaction information 183 by the central system 101, the details, i.e., the transaction certificate 184, including the AppTrID 126, and the log 166, are stored in the data storage 144. The central system 101 may then associate the transaction with the user information 176 and determine the fares 159 corresponding to each transaction certificate 184, i.e., identify the stop 156, vehicle 158, special traveler rate (if any), and determine the fare 159 to be charged to the user. Thereafter, the central system 101 may thus bill or charge the user in accordance with the stored account information 178.

In some instances, the transaction process may be interrupted prior to complete transfer of all information from the tag 200A-200C to the user device 300A-300C. The time when such interruption occurs will affect the recording and completion of the transaction. For example, if the transaction is interrupted prior to the generation of the transaction certificate 184, then no transaction is recorded. In the event that the transaction occurs after generation of the transaction certificate 184, the log 166 will include the transaction and thus a subsequent user device 300A-300C may be utilized to communicate the details of the transaction of the user device 300A-300C that had interrupted communications. In the event that an interruption occurs after communication of the transaction certificate 184, the user device 300A-300C will have a valid transaction certificate 184. In an un-gated implementation, i.e., the buses 187-188, the user may go onboard with a subsequent user device 300A-300C tasked with communicating the details (log 166) to the central system 101. In a gated implementation, i.e., the station 189, the user would have to present the user device 300A-300C to show the valid transaction certificate 184 to the tag 200C.

In each of the aforementioned instances, if the central system 101 receives a transaction, then the user information 176 will reflect the completed transaction as the user was indeed there. Other embodiments may include the case of multiple identical services, e.g. a family traveling using a single user device 300A-300C. In such an embodiment, for example, upon the second presentation of the same user device 300A-300C, the application 162 resident on the device 300A-300C may prompt the user to confirm the number of requested services, i.e., travelers/tickets. Accordingly, such an approach does not penalize the vast majority of single service requests, supports multiple service delivery, and deals properly with unwanted double presentation of the mobile device 300A-300C to the tag 200A-200C. In the preceding embodiment, the transaction certificate 184 may include an additional field to contain the number of requests. In one embodiment, entries and exits require validation such that the user device 300A-300C are presented to tags 200A-200C upon exiting the vehicle 158 or stop 156 (e.g., leaving the bus 187-188 or station 189).

The wireless system 100 for enabling transactions on an associated network illustrated in FIGS. 1A-1B further includes at least one controller device 400 capable of data communication with any of the tags 200A-200C and/or with any of the user devices 300A-300C (verification that transactions occurred, etc.). A functional block diagram of the controller device 400 is depicted in FIG. 4. As shown in FIG. 4, the controller device 400 may include a processor 402, which executes one or more instructions or the control application 172 in the performance of an exemplary method discussed below. The controller device 400 may further include a memory 404 storing the control application 172 in data communication with the processor 402 via a system bus 406. The processor 402 of the controller device 400 may be in data communication with the central system 101 via an I/O interface 412 and tags 200A-200C via an I/O interface 410. In one embodiment, the I/O interface 410 is implemented as a short-range communication component, such as, for example an NFC component. In such an embodiment, the I/O interface 410 may be configured to provide power to the tag 200A-200C to enable communication there between. In other embodiments, the short-range communication component may be implemented using any suitable short-range communications protocol, and the use of NFC protocols is for example purposes only. The controller device 400 may further include a display 408 suitably configured to display data to an associated controller, receive input from the controller, and the like. In some embodiments, the display 408 of the controller device 400 may be configured as a touch-screen display capable of receiving user instructions via user contact on the display, e.g., LCD, AMOLED, LED, RETINA, etc., types of touch-screen displays.

The memory 404 may represent any type of non-transitory computer readable medium such as random access memory (RAM), read only memory (ROM), magnetic disk or tape, optical disk, flash memory, or holographic memory. The memory 404 may include a combination of random access memory and read only memory. In some embodiments, the processor 402 and memory 404 may be combined in a single chip. The network interface(s) 410, 412 allow the controller device 400 to communicate with other devices via a communications network, and may comprise a modulator/demodulator (MODEM). Memory 404 may store data the processed in the method as well as the instructions for performing the exemplary method. The processor 402 can be variously embodied, such as by a single core processor, a dual core processor (or more generally by a multiple core processor), a digital processor and cooperating math coprocessor, a digital controller, or the like.

The memory 404 of the controller device 400 includes the control application 172, which includes the master key 160 and the blacklist of applications 174. In some embodiments, the blacklist 174 represents a localized list of applications 162 which may be suspected of fraud, and which may be used by the controller device 400 to verify the identity of a user device 300A-300C.

As shown in FIGS. 1A-1B, the controller device 400 is capable of intermittent or continuous bi-directional communication with the central system 101 utilizing the I/O interface 410. As indicated above with respect to the user devices 300A-300C, the bi-direction communication is data communication utilizing a cellular data network. The controller device 400 may function to provide all or a portion of the log 166 to the central system 101 during routine or periodic tag readings. That is, the controller associated with the controller device 400 may place the device 400 in data communication with the tags 200A-200C, the user devices 300A-300C, or both, at predetermined times or times of opportunity. In some embodiments, the controller device 400 and the user devices 300A-300C may establish a short-range communication session, e.g., an NFC connection, whereupon the application 162 and the control application 172 direct the respective devices to perform authentication using the diversified key 130 (as discussed above with respect to ticketing validation). During this connection, the controller device 400, in conjunction with the control application 172, may compare the application certificate 182, particularly the AppID 124, to the blacklist of applications 174 to determine whether the user device 300A-300C is valid, whereupon the controller device 400 communicates the log 166 to the central system 101. For redundancy purposes, the log 166 may remain on the user device 300A-300C, so as to allow the user device 300A-300C to communicate the log 166 and corresponding transaction information 183 to the central system 101 when the opportunity presents itself, i.e., when a cellular/data network connection is available. The control application 172, as implemented via the processor 402, then obtains the last transaction certificate 184 from the transaction information 183 of the user device 300A-300C (which necessarily corresponds to the user device 300A-300C in communication with the controller device 400). The transaction certificate 184 is then verified by the controller device 400 following which the transaction information 183 may be communicated by the controller device 400 to the central system 101 for billing and account updating.

The controller device 400 depicted in FIGS. 1A-1B may also be utilized to update and communicate with the tags 200A-200C. Accordingly, the controller device 400 establishes a short-range communication session (e.g., NFC, BLUETOOTH, proprietary, etc.) with the tag 200A-200C, and mutual authentication occurs utilizing the master key 160. The controller device 400 may further obtain the whole or part of the list of transaction log 166 from the tag 200A-200C, but does not remove the log 166 from the tag 200A-200C (e.g., redundancy purposes). The controller device 400 may also update the tag 200A-200C with up-to-date information, e.g., date, time, location, route/vehicle information, etc. The controller device 400, in accordance with the control application 172, then communicates the log 166, either immediately or in a deferred way (e.g., no network connection then available), to the central system 101.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 5:
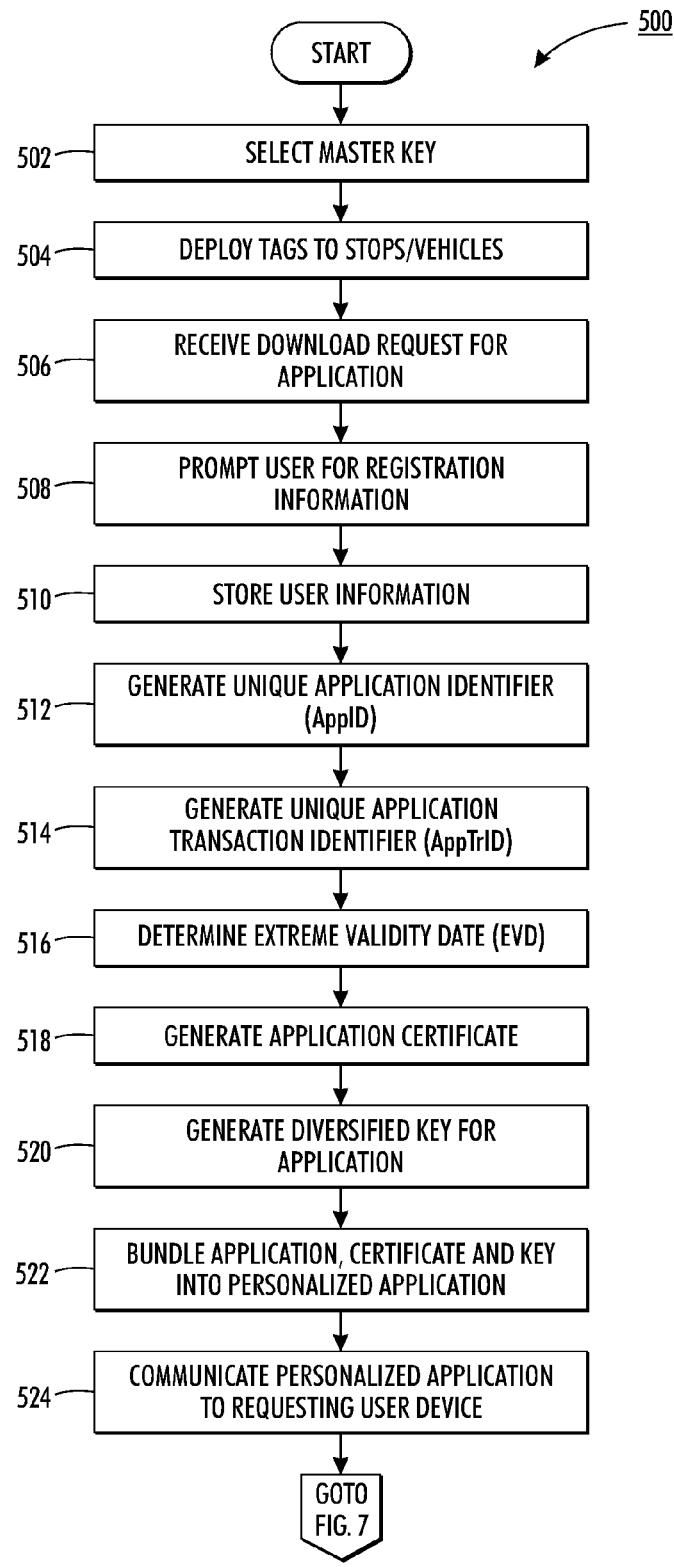
FIG. 5 is a flowchart that illustrates one aspect of the wireless method for enabling transactions on an associated network according to an exemplary embodiment.

Turning now to FIG. 5, there is shown an exemplary wireless method 500 for enabling transactions on an associated network delivering services to users. Reference is made hereinafter after to implementation of the method 500 on an associated transportation system 150 for example purposes. The method 500 depicted in FIG. 5 represents the setup of wireless payment and information collection from the perspective of the central system 101. FIG. 6, discussed below, depicts a method 600 for enabling transactions on the associated network, e.g., the transportation system 150, from the perspective of a user device 300A-300C. FIG. 7, discussed below, depicts an example wireless method 700 for enabling transactions on an associated network, e.g., the transportation system 150, in accordance with the systems and methods discussed herein.

The transaction enablement method 500 of FIG. 5 begins at 502, whereupon a master key 160 is selected by the processor 104 or other suitable component associated with the computer system 102 of the central system 101. At 504, the central system 101 oversees the deployment of tags 200A-200B to service access points, such as stops 156, vehicles 158, and other locations on the transportation system 150. In some embodiments, the tags 200A-200B are NFC tags, as discussed in greater detail above, and are positioned at predetermined locations at the stops 156 and on the vehicles 158. For example, the tags 200A and 200B may respectively be positioned near the doors of bus A 187 and bus B 188, thereby placing them in easy to access positions for travelers on the transportation system 150. Similarly, the tag 200C may be positioned adjacent to a turnstile or gate in the station 189, thereby made accessible to travelers prior to entering the boarding platform or stop 156 for the tram, subway, train, etc. It will be appreciated that other embodiments enable the controller device 400 to be utilized in the positioning of the tags 200A-200C so as to communicate the tag 200A-200C locations to the central system 101, update the tag 200A-200C with current information, and the like.

At 506, a download request for an application 162 is received from a user device 300A-300C by the computer system 102 of the central system 101. As previously discussed, the request from the user device 300A-300C may be received via a suitable data communications network, e.g., the Internet or carrier specific network. In some embodiments, the download request for the application 162 may be received via an application website, e.g., GOOGLE PLAY, ITUNES, etc. Upon receipt of the request, operations proceed to 508, whereupon the user associated with the requesting user device 300A-300C is prompted by the central system 101 for registration information, i.e., suitable account information 178. The requested account information 178 may include, for example, credit card information, billing cycles, name, user name, address, password, a physical identification unique to requesting device 300A-300C (e.g., MAC address or the like), the telephone number associated with the requesting device 300A-300C, and other account information.

The central system 101, via the computer system 102, then stores the received user information 176 in the data storage 144 at 510. That is, the account information 178 received during registration is stored in the information 176 corresponding to the user associated with the requesting user device 300A-300C. At 512, the application identifier generator 110 of the instructions 106 stored in memory 108 generates a unique application identifier (AppID) 124. The application transaction identifier generator 112 then generates, at 514, a unique application transaction identifier (AppTrID) 126 associated with the download request. An extreme validity date (EVD) 132 is then determined via the EVD determination module 114 at 516. As discussed above, the EVD 132 may be representative of an expiration date of the AppTrID 126, following which a new AppTrID 126 must be procured to utilize the transportation system 150.

At 518, the processor 104 operating in accordance with the application 162 generates an application certificate 182 comprising the AppID 124, the AppTrID 126, and the EVD 132. In one embodiment, the application certificate 182 is stored on the data storage 144 in association with the user information 176. The key generator 120 then generates a diversified key 130 utilizing the master key 160 and a key generating function at 520. The processor 104, in association with the personalized application generator 122, bundles the application 162, the application certificate 182, and the diversified key 130 into a personalized application 131 at 522. Thereafter, at 524, the central system 101 communicates the personalized application 131 to the requesting user device 300A-300C via the appropriate communications channel. Operations then proceed to FIG. 7 as discussed below.

Figure 6:
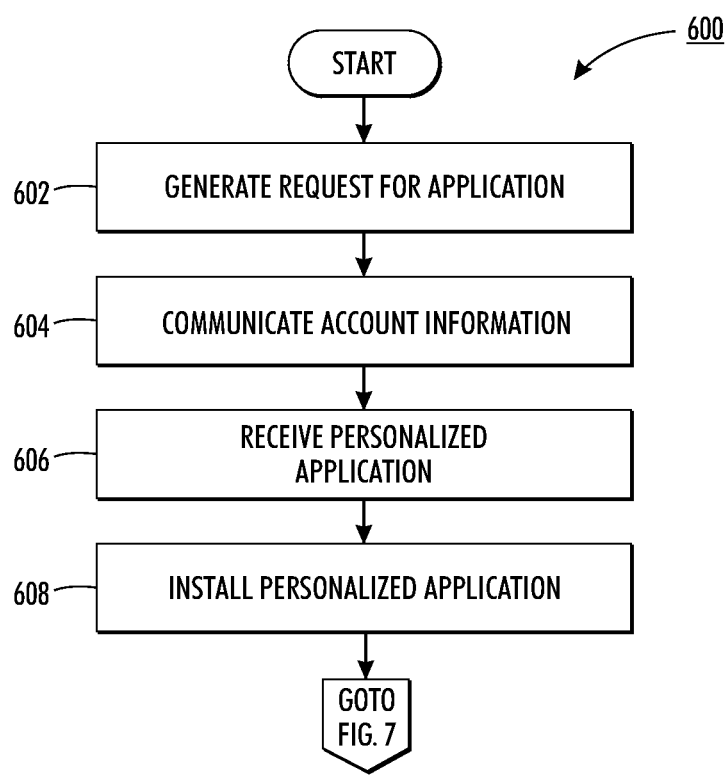
FIG. 6 is a flowchart that illustrates another aspect of the wireless method for enabling transactions on an associated network according to an exemplary embodiment.

FIG. 6 illustrates the method 600 whereby the user device 300A-300C interacts with the central system 101 to procure a personalized application 131 for use on the transportation system 150. Accordingly, at 602, the user device 300A-300C generates a request for the application 162. In some embodiments, the request may be generated by user interaction with the central system 101 via an associated web page, direct download, or the like. Responsive to a prompt from the central system 101, the user device 300A-300C communicates account information 178 to the computer system 102 via the communication link 193-195 at 604.

As indicated above with respect to FIG. 5, the central system 101 generates the personalized application 131, which is received by the user device 300A-300C at 606. The processor 302 of the associated user device 300A-300C installs the personalized application 162 at 608. That is, the application 162 is installed into memory 304, along with the application certificate 182 and the diversified key 130. Operations then proceed to FIG. 7 for use of the user device 300A-300C and tags 200A-200C in procuring services on the transportation system 150. It will be appreciated that the user associated with the user device 300A-300C may cancel payment and information collection operations at any time, for example, by contacting the central system 101 to cancel registration. The application 162 resident on the user device 300A-300C would then facilitate the deletion of the application certificate 182 and key 130, perform an uninstallation procedure, and direct the device 300A-300C to inform the central system 101 of the successful removal from the user device 300A-300C.

Figure 7:
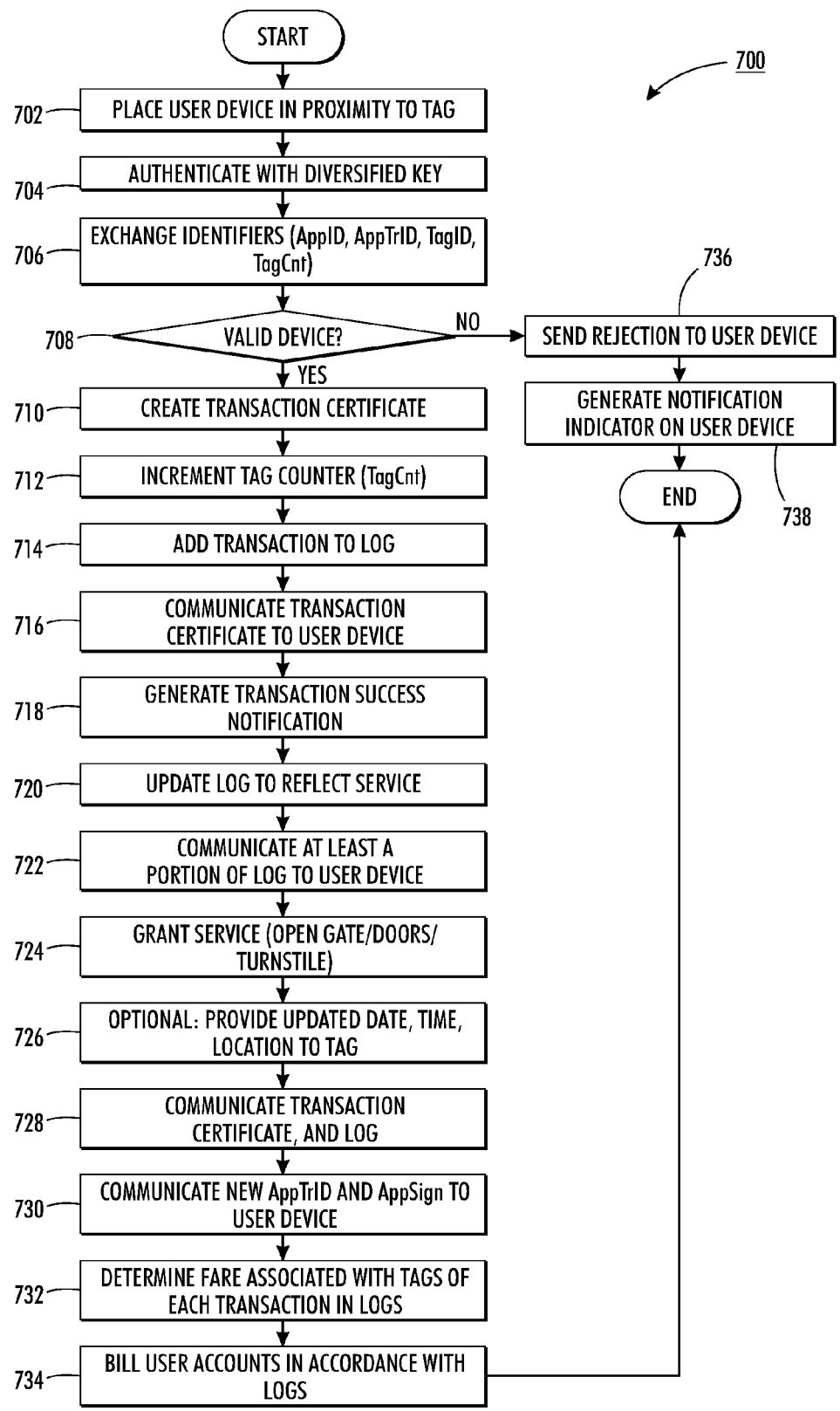
FIG. 7 is a flowchart that illustrates another aspect of the wireless method for enabling transactions on an associated network according to an exemplary embodiment.

FIG. 7 provides an example method 700 for utilization of short-range wireless payment and information collection in accordance with the systems and methods set forth above. It will be appreciated that while NFC communications are referenced with respect to FIG. 7, other short-range communication protocols may also be utilized in accordance with the exemplary method 700. For purposes of illustrating the method 700 for enabling transactions of FIG. 7, reference is made hereinafter to the user device 300A and the corresponding tag 200A shown in FIGS. 1A-1B, unless otherwise explicitly noted. However, it will be appreciated that the methodology 700 of FIG. 7 is equally applicable to any of the user devices 300A-300C and tags 200A-200C. The method 700 of FIG. 7 begins at 702, whereupon a user device 300A is brought into relatively close proximity to the tag 200A. As previously discussed, the relative proximity of the user device 300A to the tag 200A is dependent upon the type of short-range communication used, i.e., NFC requires proximity of less than 10 cm, whereas other short-range protocols have greater or less ranges. The tag 200A utilized in the example implementation of FIG. 7 is an unpowered NFC tag, thus requiring the user device 300A to generate a suitable RF field to provide power to the components of the tag 200A.

Once in proximity, the tag 200A and the user device 300A perform mutual authentication utilizing the diversified key 130 stored on the user device 300A at 704. It will be appreciated that authentication of the user device 300A may be made by the tag 200A utilizing the master key 160 and the diversified key 130, as discussed above. At 706, the user device 300A and the tag 200A exchange identifiers, i.e., the AppID 124, the AppTrID 126 the TagID 168, and the TagCnt 170. The processor 202 associated with the tag 200A then determines whether the user device 300A is a valid device at 708. In one optional implementation, the tag 200A analyzes the AppID 124, AppTrID 126 and/or EVD 132 to ascertain whether the user device 300A may utilize the transportation system 150, e.g., the user device 300A does not include an invalid or blacklisted application, the application certificate 182 has not expired (EVD 132), the AppTrID 126 has not previously been used, etc.

Upon a determination at 708 that the device 300A is not valid, operations proceed to 736. At 736, the tag 200A communicates a rejection of the transaction to the user device 300A. Thereafter, at 738, the application 162 on the user device 300A facilitates in the generation of a notification indicating the rejection of the transaction. Suitable notifications may include, for example, auditory, visual, tactile, or a combination of such indicators. Operations then terminate with respect to FIG. 7, thereby requiring the user device 300A to communicate with the central system 101 to re-register or download a new AppID 124, AppTrID 126, certificate 182, etc.

When it is determined at 708 that the user device 300A is a valid device with respect to the transportation system 150, operations progress to 710, whereupon the tag 200A generates a transaction certificate 184 in accordance with the AppID 124 and AppTrID 126 received from the user device 300A. As previously addressed, the transaction certificate 184 may include AppID 124, AppTrID 126, an AppDTP 186, the TrSign 167, the TagID 168, and the TagCnt 170. In one embodiment, the tag 200A signs the transaction certificate 184 using the master key 160, unique TagID 168, or the like to generate the TrSign 167 prior to communication of the transaction certificate 184 to the user device 300A. The counter (TagCnt 170) is then incremented at 712 to reflect the current transaction underway between the tag 200A and the user device 300A. The transaction is then added to the log 166 on the tag 200A at 714. In one embodiment, the transaction certificate 184 is stored in the log 166 on the tag 200A.

At 716, the tag 200A, via the transceiver 206, communicates the generated transaction certificate 184 to the user device 300A using the established short-range communication channel, i.e., the NFC connection. The user device 300A, in accordance with the application 162 resident thereon, generates a transaction success notification at 718. Suitable notifications of success may include, for example, auditory, visual, tactile, or a combination of such indicators. The tag 200A then updates the log 166 to reflect the service at 720.

At 722, at least a portion of the log 166 is communicated by the tag 200A to the user device 300A. In some embodiments, a selection of previous transactions (e.g., the last 10 transactions, the last 5 transactions plus 5 much older transactions (in case a group of fraudsters try to avoid their first transactions to be transmitted to the system), or the like), including the current transaction, in the log 166 are sent to the user device 300A. The tag 200A then facilitates the granting of the service associated with the transaction at 724, i.e., boarding the bus 187, traveling on the transportation system 150, etc. As discussed above, when the user device 300C is in communication with the tag 200C, the service granted may be the unlocking of a gate, door, turnstile, or other physical access means at the station 189 so as to allow the associated user access to the transportation system 150. Alternatively, the tag 200C may proactively allow the service to be performed without further input of the user device 300C, as discussed in greater detail above. As illustrated in FIG. 7, at 726, the user device 300A may optionally provide updated information to the tag 200A, i.e., date, location, time, etc.

At 728, the user device 300A communicates the received transaction certificate 184 and the log 166 to the central system 101. As previously discussed, the user device 300A and the central system 101 need not be in constant communication. For example, if the user associated with the user device 300A is boarding a subway, cellular communication signals may not be capable of being received. In such circumstances, the application 162 resident on the user device 300A may wait to send the transaction information 183 to the central system 101 until a suitable data connection is available.

Once the user device 300A communicates the transaction information 183 to the central system 101, operations proceed to 730. The application transaction identifier generator 112 generates a new AppTrID 126 and the application signature generator 118 generates a new AppSign 128, which are communicated to the user device 300A at 730. At 732, the processor 104 determines the fare 159 corresponding to the stop 156 or vehicle 158 associated with the tag 200A-200C based upon the TagID 168 contained in the transactions of the received log 166. For example, the fare 159 for the various travelers on bus A 187 may be different in accordance with the stop on which they boarded, which are recorded in the log 166 communicated to the central system 101. The central system 101 then facilitates the billing of the transactions at 734 based upon the received transaction information 183 and determined fares, to the user as directed by the stored account information 178. It will be appreciated that the fares may be individualized for a specific location, thus allowing implementation of the system 100 across multiple cities and transportation networks. Additionally, complex fare rules, including discounts for frequent travelers, may be implemented.

It will be appreciated that while reference has been made to the tags 200A-200C being NFC tags, other types of tags may be utilized in accordance with the systems and methods discussed above. For example, a controller device 400 may be used to facilitate the transaction and provisioning of services. Thus, the application 162 on the user device 300A-300B would generate a visual code, such as a DatGlyph or a QR code, and display it on screen 308. The controller device 400 would take a picture of the user's screen 308 to control the user access to the transportation system 150 and verify the transaction. In such an embodiment, the controller device 400 would identify the appropriate bus 187-188 or station 189 (for fare determination) and communicate the transaction to the central system 101. In another embodiment, the application 162 may encode location information in the QR code or DatGlyph prior to displaying the same to the controller device 400 for access to the system 150.

The foregoing systems and methods facilitate enabling transactions on an associated network by providing wireless payment and information functionality that requires low-cost investments in infrastructure and is capable of being utilized by a wide variety of travelers, given the ubiquitous use of mobile communication devices such as smartphones. Additionally, the systems and methods discussed above provide substantial benefits in protecting against fraud. For instance, assuming that some form of fraudulent travel is occurring, the requirement that the tags 200A-200B update the irreversible TagCnt 170 at each generated transaction provides the central system 101 with the ability to detect fraudulent activity a posteriori. That is, the transaction information 183 from the applications 162 of the user devices 300A-300C may be compared to the logs 166 collected by the controller device 400 from the tags 200A-200C. Furthermore, non-repudiation may be achieved by requiring the application 162 of each user device 300A-300C to sign the TagID 168 and TagCnt 170 in the transaction certificate 184. Accordingly, based upon the collection of tag logs 166 of transaction certificates 184 by both correctly functioning applications 162 and the controller device 400, eventually the central system 101 will become aware of all transactions and be able to identify any fraudulent transactions.

Attempts at fraudulent use of the wireless system 100 for enabling transactions on an associated network may include the use of a fake application, which would imitate the positive feedback at validation time, e.g., similar to contactless cards, when a user shows an object that generates (or not) the sound expected by the social environment. However, the subject systems and methods alleviate this type of usage, i.e., a fake application is rejected by the tag 200A-200C, is detected at any control (central system 101 or controller device 400), and does not allow access in gated systems.

Other fraudulent usage may include a non-connecting application on a user device 300A-300C, which would behave like the application 162 except that it would never or not always connect to the central system 101 for reporting of the transaction information 183, thus avoiding charging the user. However, the user of the non-connecting application will eventually be charged since transactions are recorded (log 166) on the tags 200A-200C and collected by the next user device 300A-300C or controller device 400 for transmission to the central system 101. Cloned applications (a copy of a valid application 162, but on multiple user devices) may also be utilized in fraudulent transactions. However, fraud in this instance may be easily detected as the clone will use an old AppTrID 126.

Falsification of the location of tags 200A-200C, i.e., the tags 200A-200C are moved for fraudulent purposes. This type of fraudulent activity may be detected by the central system 101 cross-checking the location. For example, if the tag 200A-200B is in a vehicle 158, the computer aided dispatch or automatic vehicle location system together with the transaction timestamps allow verification that the sequence of logged transactions corresponds to the schedule 154 that the vehicle 158 is following. If the user device 300A-300C includes GPS (or other positioning systems), the tag location may also be sent in the transaction information, e.g., AppDTP 186 (application date, time, place). Other ways to detect such falsified location of the tag 200A-200C may utilize the controller device 400, which may allow the control application 172 to confer with the central system 101 as to whether the tag 200A-200C is in the correct location (based upon the GPS position of the controller device 400).

The method illustrated in FIGS. 5-7 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3-5, can be used to implement the method estimating origins and destinations for users of a transportation system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A wireless method for enabling transactions on an associated transportation network delivering services to end users, comprising:
   generating a diversified key from a master key stored in a memory in communication with a computer processor of a central system in communication with a computer network;
   generating at the central system, a personalized application including a service providing application, an application certificate and the diversified key, wherein generating the personalized application by the central system further comprises:
   generating a unique application identifier;
   generating a unique application transaction identifier;
   determining an extreme validity date in accordance with a preselected validation period;
   creating the application certificate in accordance with the unique application identifier, the unique application transaction identifier, and/or the determined extreme validity date; and
   generating the personalized application in accordance with the service providing application and at least one of the application certificate and the diversified key;
   communicating by the central system the personalized application to at least one user device having an intermittent connection with the computer network;
   receiving transaction information at the central system from the at least one user device via the intermittent computer network connection corresponding to a transaction between the at least one user device and at least one of a plurality of tags deployed at a corresponding plurality of affiliated transportation network access points, the transaction information including a transaction certificate and at least a portion of a log of transactions between the at least one of the plurality of tags and a plurality of disparate user devices stored in a non-volatile memory on the at least one of the plurality of tags, the transaction certificate including a unique application transaction identifier specific to the application on the at least one user device and a unique transaction signature generated in response to an individual transaction between a tag and a user device;
   determining a price for each transaction in the at least a portion of the log of transactions associated with the received transaction information;
   responsive to receiving the transaction information, generating by the central system, a new unique application transaction identifier; and
   communicating, to the at least one user device over the computer network via the intermittent network connection, a new unique application transaction identifier specific to the application resident on the at least one user device associated with the received transaction certificate,
   wherein the generating, communicating, receiving, determining, and communicating is performed with the computer processor of the central system;
   wherein each of the plurality of tags includes a unique tag identifier, a log of transactions that is a cyclic file holding a plurality of the most recent transactions between the corresponding tag and a plurality of user devices, an irreversible digital counter, the master key stored in the non-volatile memory thereof, and a processor in communication with the memory;
   placing the at least one user device in proximity to at least one of the plurality of tags;
   establishing a short-range communication channel between the at least one user device and the at least one tag;
   exchanging identification information including at least one of a unique application identifier, the unique application transaction identifier, or a tag identifier;
   generating a transaction certificate responsive to an authentication of the at least one user device by the at least one tag;

communicating the transaction certificate and all or a portion of the cyclic log file to the at least one user device via the short-range communication channel; and communicating the transaction certificate and all or a portion of the cyclic log file to the central system.

2. The wireless method of claim 1, further comprising:
receiving user information from a user associated with the at least one user device; and
storing the user information in an associated data storage of the central system in association with the application certificate, wherein the personalized application is generated by the central system responsive to receiving the user information.

3. The wireless method of claim 1, wherein the short-range communication channel is a near field communication (NFC) channel.

4. The wireless method of claim 3, wherein the at least one tag is an unpowered tag, further comprising powering the at least one tag by the at least one user device via the NFC channel.

5. The wireless method of claim 3, further comprising incrementing the irreversible counter of the at least one tag responsive to the generation of a transaction certificate.

6. The wireless method of claim 5, further comprising:
updating the log of the at least one tag responsive to the generated transaction certificate; and
granting a service associated with the at least one tag to the at least one user device.

7. The wireless method of claim 6, wherein the service is activating a turnstile, opening a gate, opening a door, opening a barrier or allowing a boarding of a user associated with the at least one user device.

8. A wireless system for enabling transactions between a plurality of user devices and a central system on a transportation network, comprising:
a central system, including:
a processor; and
a memory comprising processor executable instructions which when executed by the processor cause the processor to perform the method of:
generating, via a key generator, a diversified key in accordance with a master key stored in an associated data storage;
generating, via an application identifier generator, a unique application identifier for a service providing application corresponding to an associated user device;
generating, via an application certificate generator, an application certificate inclusive of the unique application identifier;
generating, via a personalized application generator, a personalized application inclusive of the application, the application certificate, and the diversified key;
analyzing transaction information received from the associated user device via an intermittent network connection corresponding to a transaction between the associated user device and at least one of a plurality of tags deployed on an associated network, the transaction information including a transaction certificate and at least a portion of a log of transactions between the at least one of the plurality of tags and a plurality of disparate user devices stored in a non-volatile memory on the at least one of the plurality of tags, the transaction certificate including a unique application transaction identifier specific to the application on the at least one user device and a unique transaction signature generated in response to an individual transaction between a tag and a user device;
determining a price for each transaction in the at least a portion of the log transactions;
generating a new unique application transaction identifier in response to the received transaction information;
communicating, to the at least one user device over the computer network via the intermittent network connection, a new unique application transaction identifier specific to the application resident on the at least one user device associated with the received transaction certificate; and
wherein each of the plurality of tags is an NFC tag comprising:
a transceiver;
a processor; and
non-volatile memory storing a unique tag identifier, an irreversible counter, a log of completed transactions that is a cyclic file holding a plurality of the most recent transactions between the corresponding tag and a plurality of user devices, a master key, the non-volatile memory comprising processor executable instructions which when executed by the processor cause the processor to perform the steps of:
exchanging identification information including the unique application identifier and the tag identifier;
generating a transaction certificate responsive to an authentication of the at least one user device by the at least one tag;
incrementing the irreversible counter responsive to the generation of the transaction certificate; and
communicating the transaction certificate and all or a portion of the cyclic log file to the associated user device via the near field communication (NFC) channel.

9. The wireless system for enabling transactions of claim 8, wherein the memory further stores instructions for generating, via the application certificate generator, the application certificate inclusive of the unique application identifier, and at least one of a unique application transaction identifier and an extreme validity date.

10. The wireless system for enabling transactions of claim 8, wherein the plurality of tags are deployed to a plurality of vehicles or stops of the associated transportation network.

11. The wireless system for enabling transactions of claim 8, wherein the memory stores instructions for:
updating the log in accordance with the generated transaction certificate; and
granting a service associated with the at least one tag to the at least one user device.

12. The wireless system for enabling transactions of claim 11, wherein the service is activating a turnstile, opening a gate, opening a door, or allowing a boarding of a user associated with the at least one user device.

13. The wireless system for enabling transactions of claim 8, wherein the user device comprises:
an NFC interface configured to communicate with at least one of the plurality of tags;
memory storing the application, the application certificate, and the diversified key;
memory which stores instructions for:
communicating the application identifier to the at least one tag, receiving transaction information from the tag including the transaction certificate and at least a portion of the log, and establishing an opportunistic connection with the central system so as to communicate the received transaction information from the at least one tag; and a processor in communication with the memory which executes the instructions.

14. The wireless system for enabling transactions of claim 13, wherein the user device memory further stores instructions for generating a notification indicative of a successful transaction with the at least one tag.

15. The wireless system for enabling transactions of claim 14, further comprising a controller device having a processor in communication with memory, the memory storing instructions which are executed by the processor for:

establishing a near field communication connection with at least one of the associated user device or the at least one tag;

receiving the transaction information via the near field communication connection; and verifying the associated user device has completed the transaction.

16. A computer-implemented method for enabling transactions on an associated transportation network, comprising:

receiving, by a user device having a processor, a personalized application including a service providing application, an application certificate having an application identifier, an application signature, and a diversified key from an associated central system over an intermittent connection with the computer network;

authenticating with a tag via a near field communication connection, in accordance with the diversified key and a master key stored in a non-volatile memory on the tag;

validating the user device for access to the associated transportation network in accordance with an exchange of the application identifier and a tag identifier;

generating, on a display of the user device, a notification to an associated user indicative of a successful transaction responsive to a validation of the user device;

receiving a transaction certificate from the tag, the transaction certificate including the application identifier, the tag identifier, a unique application transaction identifier, and a unique transaction signature generated by the tag in response to an individual transaction between the tag and the user device;

receiving, by the user device from the tag, at least a portion of a log stored in the non-volatile memory of the tag, the log being a cyclic file holding a plurality of the most recent transactions between the corresponding tag and a plurality of disparate user devices;

communicating the transaction certificate and the at least a portion of the log to the central system via the intermittent computer network connection;

receiving by the user device, from the central system via the intermittent network connection, a new unique application transaction identifier specific to the application resident on the user device associated with the transaction certificate;

communicating, by the user device with the tag via an NFC interface;

storing, via a memory of the user device, the application, the application certificate, and the diversified key;

transmitting, by the user device, the application identifier to the at least one tag;

receiving, by the user device, transaction information from the tag including the transaction certificate and at least a portion of the log; and establishing, by the user device, an opportunistic connection with the central system so as to communicate the received transaction information from the tag.

17. The computer-implemented method of claim 16, wherein the transaction certificate further includes a transaction identifier and a tag counter representative of an irreversible counter stored in the non-volatile memory on the tag, and wherein communicating the transaction certificate and the at least a portion of the log to the central system further comprises receiving a new unique application transaction identifier and application signature from the central system.

* * * * *